United States Patent [19]

Tagami et al.

[11] Patent Number: 4,531,123
[45] Date of Patent: Jul. 23, 1985

[54] APPARATUS FOR VISUALLY INDICATING THE TRAVEL ROUTE OF AN AUTOMOTIVE VEHICLE

[75] Inventors: Katsutoshi Tagami; Tsuneo Takahashi, both of Saitama; Shinichiro Yasui, Tokyo; Akira Ichikawa, Saitama, all of Japan

[73] Assignee: Honda Giken Kogyo Kabushiki Kaisha, Tokyo, Japan

[21] Appl. No.: 385,671

[22] Filed: Jun. 7, 1982

[30] Foreign Application Priority Data

Jun. 5, 1981 [JP] Japan .................................. 56-87157

[51] Int. Cl.³ .............................................. G08G 1/12
[52] U.S. Cl. ................................ 340/995; 340/309.15; 73/178 R; 73/505; 73/516 LM; 364/450; 364/460
[58] Field of Search ...................... 340/23, 24, 309.15, 340/995, 998, 988; 364/457, 460, 449, 450; 73/178 R, 516 LM, 505, 504, 1 E; 343/451, 452; 33/356

[56] References Cited

U.S. PATENT DOCUMENTS

| 3,948,107 | 4/1976 | Asmar | 73/516 LM |
| 3,960,344 | 6/1976 | Dugan | 340/24 |
| 4,026,159 | 5/1977 | Isakson | 73/516 LM |
| 4,402,050 | 8/1983 | Tagami | 364/450 |
| 4,408,490 | 10/1983 | Takahashi | 73/516 LM |

FOREIGN PATENT DOCUMENTS

| 2705795 | 9/1977 | Fed. Rep. of Germany . |
| 1537050 | 12/1978 | United Kingdom . |
| 2029722 | 3/1980 | United Kingdom . |
| 2053470 | 2/1981 | United Kingdom . |
| 2062307 | 5/1981 | United Kingdom . |
| 2066953 | 7/1981 | United Kingdom . |
| 2085162 | 4/1982 | United Kingdom . |

OTHER PUBLICATIONS

*Industrial Electronics,* Spracklan, Feb. 1965, pp. 72–76.

*Primary Examiner*—James J. Groody
*Attorney, Agent, or Firm*—Irving M. Weiner; Pamela S. Burt

[57] ABSTRACT

An apparatus for use in an automotive vehicle for visually indicating the travel route thereof. A current travel route of the vehicle is arithmetically obtained in terms of two-dimensional coordinates for a unit travel distance of the vehicle on the basis of outputs from a travel distance detecting unit and a gas rate sensor. The thus-obtained locational data on the current location of the vehicle, varying from time to time, is stored in sequence, and the current travel path of the vehicle is continuously visually indicated. A timer unit is provided for starting the supply of power to the gas rate sensor a sufficient amount of time prior to starting the vehicle to permit the sensor to reach a stable working temperature in advance.

2 Claims, 4 Drawing Figures 4,531,123

APPARATUS FOR VISUALLY INDICATING THE TRAVEL ROUTE OF AN AUTOMOTIVE VEHICLE

BACKGROUND OF THE INVENTION

1. Field of the Invention

The present invention relates to a travel route indicating device for use in a vehicle, and more particularly to an improved apparatus for determining and visually indicating a current location, a travelling path and a current travel direction of an automotive vehicle to its driver.

2. Description of the Prior Art

In the attempt to prevent the driver of an automotive vehicle or the like from losing his way when driving such as at night or in unfamiliar surroundings away from his desired route of travel, there have been developed a variety of apparatus which are designed to visually indicate continuously or discretely a due current position or the like information on the vehicle by way of an indication panel or display screen including a related road map or the like disposed at the driver's seat so that he may be provided with a necessary ready guidance relating to the vehicle's current status of travelling with respect to a desired course of travel.

In the conventional travel route indicating apparatus for such an application, a current travel distance of a vehicle is detected in accordance with its speed of travel and time by using a distance detecting section, a current bearing and a current quantity of azimuthal deviation of the vehicle are detected by a bearing detecting section which employs a gas rate sensor or the like adapted to detect a possible angular velocity produced about the axis of yawing motion of the vehicle, a current location of the vehicle along its travel route is obtained from an arithmetic operation on the thus-obtained data, and the results of this arithmetic operation are stored in sequence, and indicated visually by way of spot information varying from time to time on a display screen upon which there is presented a transparent road map of routes or roads along which the vehicle is to travel.

With the conventional construction as described above, it is common in practice that because of the advantageous performance of such a device known as a gas rate sensor which exhibits a substantial resistance to physical vibrations, a substantial sensitivity and a rapid responsiveness when compared with a mechanical detecting device such as a gyroscope or the like. the gas rate sensor is a typical means enployed to detect an azimuthal motion of the vehicle, which is designed to detect an angular velocity produced from a turning motion of the vehicle in terms of a fractional or fine amount of difference in the sensed heat factor as generated by a possible change in the gas flow within the gas rate sensor from an azimuthal deviation such as generated in the turning motion of the vehicle. However, it is to be noted that it is essential for the gas rate sensor to have a constant internal temperature for attaining an accurate bearing detection of an object upon which it is mounted, and that its internal temperature does not rise up to a desired constant level until a substantial period of time has passed after starting thereof. At the same time, according to such temperature characteristic of the gas rate sensor, it is susceptible to a possible change in the external temperature therearound as an immediate disturbance factor. In this respect, it is undesirable to employ this gas rate sensor for such an application, without any particular condiserations for temperature control.

In this connection, there has been made available no desirable installation of such gas rate sensor having a high sensitivity, and due to the difficulty in handling for use in an automotive vehicle, installation work has been uneconomical in practice.

The present invention is essentially directed toward overcoming such inconveniences and difficulties as experienced in the conventional design of a visual travel route inicating apparatus which incorporates a gas rate sensor.

SUMMARY OF THE INVENTION

It is therefore a primary object of the present invention to provide an improved travel route indicating apparatus for use in an automotive vehicle incorporating a gas rate sensor, which is designed to be supplied with the power prior to the start of a travel path indication on a display to an extent that corresponds to a time required to attain a desired internal working temperature, so that it may be ready to start its bearing detecting operation in a stable condition at any moment desired.

More specifically, it is a further object of the present invention to provide an improved travel route indicating apparatus for use in an automotive vehicle, which is arranged such that the gas rate sensor can be heated forcibly at any time when so desired for assisting the internal temperature of the sensor in rising quickly, and also for eliminating a possibility that the internal temperature of the gas rate sensor is under the influence of an external temperature.

According to the present invention there is provided, as briefly summarized, an improved travel route indicating apparatus for use in an automotive vehicle, wherein a current travel route of the automotive vehicle in terms of two-dimensional coordinates may be obtained arithmetically for a unit travel distance of the vehicle on the basis of the outputs from a travel distance detecting unit adapted to detect a current travel distance of the vehicle, and from a gas rate sensor adapted to detect a resultant azimuth taken by the vehicle after the travel of the vehicle up to a current point of tavel, so that the thus-obtained location data on the current location of the vehicle varying from time to time may be stored in sequence, and so that the current travel path of the vehicle may be continuously visually indicated as the vehicle travels, which comprises, in combination, a timer unit adapted to cause power supply means to initiate the supply of power to the gas rate sensor means upon the expiration of a preset period of time, which corresponds to the period required for the gas rate sensor to reach a stable working temperature.

The above and further objects, advantages and details of the present invention will become more apparent from the following detailed description by way of a preferred embodiment of the invention, when read in conjunction with the accompanying drawings, in which like parts are desisgnated with like reference numerals.

DETAILED DESCRIPTION OF THE INVENTION

The present invention will now be described in detail with respect to a preferred embodiment thereof, by way of example, in conjunction with the accompanying drawings.

Figure 1:
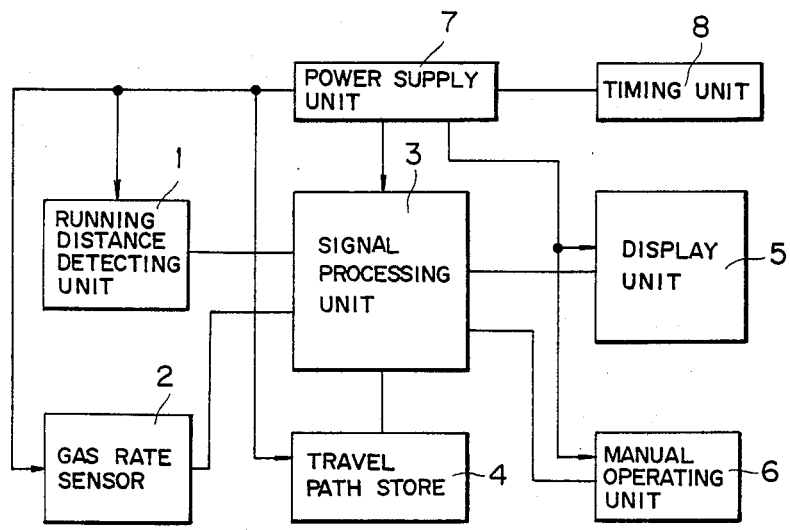
FIG. 1 is a schematic block diagram which shows the basic construction of the travel route indicating apparatus according to a preferred embodiment of the present invention.

Now, referring to FIG. 1, there is shown schematically the typical and basic construction of an improved travel route indicating apparatus for use in an automotive vehicle according to the present invention, which comprises by way of a preferred embodiment thereof, a travel distance detecting unit 1 adapted to generate an electric pulse signal corresponding to a current travel distance of the vehicle, a gas rate sensor 2 adapted to output an electric signal which is proportional to a current bearing or a current amount of azimuthal deviation of the vehicle in connection with a current travel direction thereof, and a signal processing unit (CPU) 3 adapted to count electric pulse signals from the travel distance sensor 1 so as to determine a current travel direction of the vehicle from the output from the gas rate sensor 2 while measuring the current travel distance of the vehicle, and also to arithmetically operate in accordance with the results of such measurement to obtain a current location of the vehicle in terms of two-dimensional coordinates for a given unit distance of travel of the vehicle, while centrally controlling the entire apparatus. A travel path store 4 (RAM) is adapted to sequentially store the locational data varying from time to time in terms of the two-dimensional coordinates as obtained by the signal processing unit 3 and hold the thus-obtained data as finite and continuous information on the positions corresponding to the current location taken by the vehicle. A display unit 5 is adapted to visually indicate information as updated from time to time, such as a current travel distance of the vehicle, a current resulting travel path up to a current point of the vehicle, a current travel direction, a time required to reach a current point of travel, etc. A manual operating unit 6 is adapted to transmit an indication command to the signal processing unit 3 so as to modify appropriately the settings such as of a directional change of the positions of such indication, a partially enlarged indication of a current travel path, a manual selection of a current scale of indication, etc. A power supply unit 7 is adapted to supply the power (a power battery) to each of elements 1 through 6, and a timing unit 8 is adapted to provide a start-of-power-supply command to the power supply circuit 7 after the lapse of a predetermined period of time.

Now, description will be given on the basic operation of the travel path indicating apparatus as constructed according to the present invention.

With the above-described construction of the vehicle travel route indication apparatus according to the present invention, it is to be noted that as a first step, a power switch (not shown) of the power supply unit 7 is turned on before the start-up of the vehicle, thus feeding the power to each of the elements 1 through 6, and thereafter manually presetting a predetermined start or reference point of the vehicle's travel and a desired scale of indication on the display unit 5 by way of the manual operating unit 6. After such procedures, and when the vehicle starts its travel, a single pulse signal is sent at an interval of unit travel distance from the distance detecting unit or sensor 1 to the signal processing unit 3, where the number of pulses is counted so as to measure a current travel distance of the vehicle, while sending the output from the gas rate sensor 2 to the signal processing unit 3, thus determining a current cruising direction or azimuthal change of the vehicle motion from time to time. The signal processing unit 3, as stated above, operates to arithmetically obtain at each moment a current location or graphic point (x, y) on the X—Y coordinates in the preselected scale of indication on the display unit 5 in accordance with the current travel distance and the current azimuthal deviation of the vehicle which were detected in the manner described above, the results of which operation are subsequently sent to the travel path store 4 so as to be stored therein. The thus-stored content is constantly read out to be sent to the display unit 5 for visual indication. At the same time, a current azimuthal signal at a current location of the vehicle is sent out from the signal processing unit 3 to the display unit 5 in due sequence.

Figure 2:
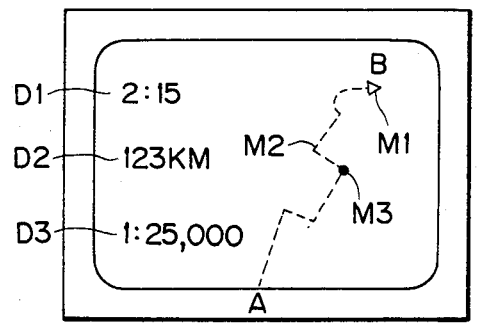
FIG. 2 is a schematic view showing a typical example of the visual indication of the travel route indicating apparatus of the invention.

More specifically, as typically shown in FIG. 2, such inputs to the display unit 5 from both the travel path store unit 4 and signal processing unit 3 are adapted to visually indicate by way of an azimuthal indication mark M1 appearing at the current location B of the vehicle and a travel path indication mark M2 showing the vehicle's current path of travel from the predetermined starting or reference point A to the vehicle's present position B in a simulated manner following the current travel route of the vehicle. In this connection, for the purpose of enabling a tracing check to be made on the spot along the travelling route of the vehicle as indicated by the travel path indication mark M2 on the display unit 5, as to whether or not the present travel path up to a current point complies with the desired path at any point while driving, a retrieving mark M3 may be placed at any point along the path of travel indication mark M2 indicated on the display unit 5 by a manual operation of the manual operating unit 6.

In addition, the display unit 5 may also be arranged, as exemplified in FIG. 2, in a manner that there is indicated such additional auxiliary indication shown in accordance with the signals as supplied from the signal processing unit 3, such as an indication of time as shown by D1 which was spent by the vehicle in reaching the current location B (which is attained by using a suitable timer incorporated in the signal processing unit 3 operating or counting the time period that the vehicle travels), an indication of a current total mileage with a mark D2 up to that location B, and/or an indication of selected scale of display with a mark D3 selected by way of the manual operating unit 6, as desired.

As fully explained hereinbefore, it is possible for the vehicle's driver to readily and assuredly identify in which way his vehicle is cruising by way of a reference of a current path of travel as visually indicated upon the screen of the display unit 5 to the pattern of a road in the map as shown on the display screen.

With such arrangement of the travel path indicating unit, as a primary aspect of the present invention, there is provided a suitable timer unit 8 which is adapted to select a desired timing setting in such a manner that it may serve to provide a power supply starting command to the power supply circuit 7 so that such circuit can automatically start supplying the power to each of the working units 1 through 6 at such timing as set in advance by the driver before starting the vehicle, independently of the power switch.

In operation, by virtue of such arrangement of the travel path indicating unit as described above, the driver may selectively set the timing unit 8 at such a timing, before starting, that is equal with the very period of time that each of the essential units 1 through 6 requires to reach its stability in the due temperature characteristics, so that such units, particularly the gas rate sensor 2, may automatically be turned on in advance and may have reached their stable state in terms of their own temperature characteristics, whereby they are ready for a proper indication of a travel path to be taken by the vehicle immediately upon starting the vehicle, whenever so desired. More specifically, this particular feature of automatic timed control with respect to power supply is, of course, specifically directed to at least the gas rate sensor 2, among any other elements concerned.

Figure 3:
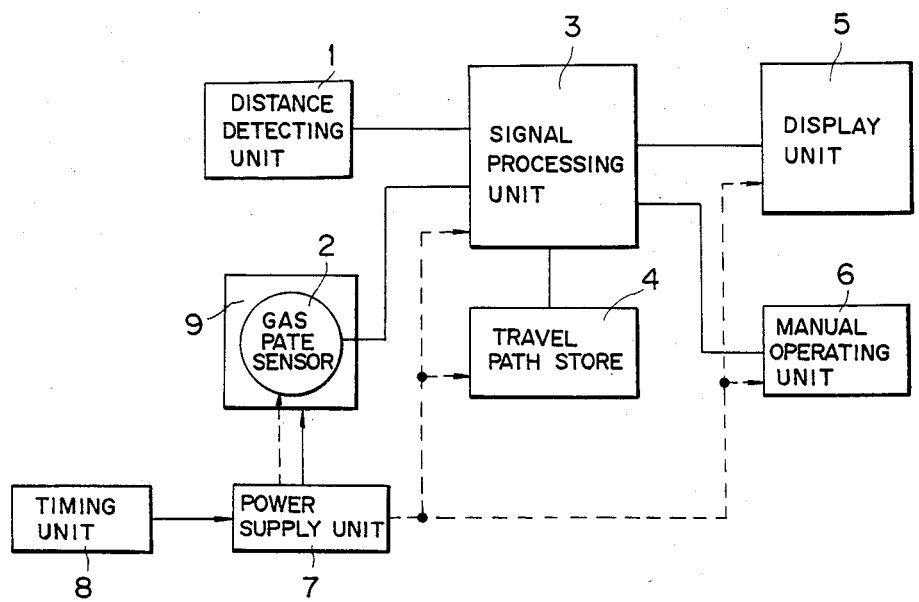
FIG. 3 is a schematic block diagram which shows another embodiment of the bearing detecting apparatus according to the invention.

Now, referring to FIG. 3, there is shown another embodiment of the present invention, in which the gas rate sensor 2, which takes a substantial time before it reaches its stable working temperature and which is most susceptible to an occasional ambient temperature change, is mounted properly in the inside of a thermostatic oven 9 which is positively heated from the power supply unit 7 in such a manner that it may be powered by the timer unit 8 which provides power supply upon the expiration of a preset period of time. More specifically, there is provided a thermostatic switch (not shown) which is designed to open the power supply circuit for a heater of the thermostatic oven 9 when it becomes higher in temperature than a predetermined level, and to close the power supply circuit when lower than the predetermined temperature level, thus serving to maintain the inside temperature of the oven at a desired point. The essential units 1 through 6 are also supplied with power with the employment of a power switch of the power supply circuit 7.

By virtue of the above-described advantageous arrangement, it is now possible in practice that the gas rate sensor 2 placed within the thermostatic oven 9 can naturally be heated forcibly independently of its ambient temperature so that it may reach its stable working temperature quickly when necessary, and so as to provide the due visual travel path indication of a vehicle within as short as possible a controlled period of time as set in advance on the timer unit 8 upon the start of the vehicle.

Moreover, the thermostatic oven 9 is naturally designed with a capability to maintain its internal temperature at a constant level after start of the vehicle, whereby it efficiently and advantageously prevents the gas rate sensor 2 from being under any disturbances because of a contingent ambient temperature change.

Figure 4:
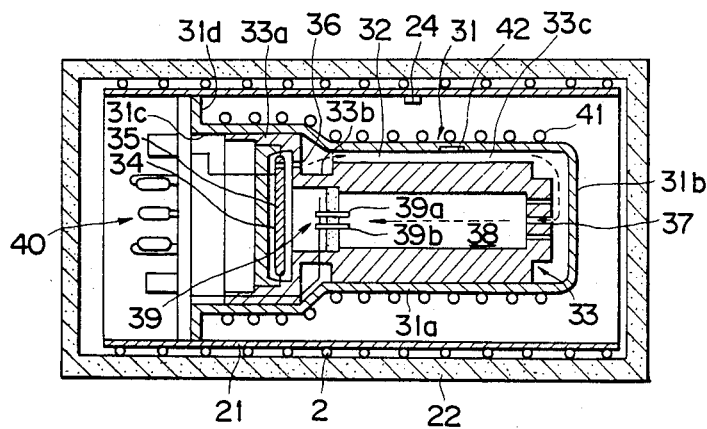
FIG. 4 is a front elevational view, in cross-section, showing a practical example of the construction of a thermostatic oven together with a gas rate sensor according to the present invention.

FIG. 4 is a schematic view showing a practical construction of the thermostatic oven 9 in which the gas rate sensor 2 is incorporated.

In FIG. 4, reference numeral 31 designates the outer casing of the gas rate sensor 3, and the casing 31 has a cylindrical hollow body 31a, one end of which body is closed by an end plate 31b. On the other hand, the opposite end of the body 31a has an opening 31c, around the opening 31c being provided a flange 31d. It is to be noted that the cross-sectional shape of the body 31a is not shown in the FIG. 4, but circumference thereof is divided equally into three portions projecting radially inwardly in the manner of ridges, with passageways 32 extending axially between the adjacent ridges.

Inside of the casing 31 there is enclosed the complete gas rate sensor 33. This complete sensor 33 comprises a holder part 33a, a neck portion 33b and a cylinder portion 33c, within which holder part 33a there is provided a pump chamber 34. Within pump chamber 34, there is provided a piezoelectric plate 35 serving as a pump element. Gas compressed within the pump chamber 34 is discharged from an outlet 36, flowing along the outer circumference of the cylinder portion 33c and along the passageways 32 in the axial direction. On the other hand, there is provided a nozzle orifice 37 at the leading end of the cylinder portion 33c, this nozzle orifice 37 communicating with an internal passageway 38, and at the end of the internal passageway 38 there are disposed temperature sensing elements 39a and 39b, which comprise a flow sensor 39. With such construction, gas passing through the outlet 36 and along the axial passageways 32 is introduced from the nozzle orifice 37 into the internal passageway 38, and then ejected toward the temperature sensing elements 39a and 39b. Now, in the operation of such construction, when there occurs an angular motion on the gas rate sensor from the outside, the gas flowing within the internal passageway 38 would be deflected to an extent that would change an output value of the flow sensor element 39 at the moment of such angular motion. This fine change as provided in the output value of the flow sensor is amplified through an amplifier and then delivered outside.

Around the outer surface of the casing 31 there is provided a sheathed heating wire 41 wound in a spiral fashion for heating the casing 31 when supplied with power. With this sheathed heating wire 41, the internal temperature of the casing 31 can be adjusted as desired, and preferably, there is further provided a temperature detecting sensor 42 in the inside of the casing 31 so that it may properly turn on and off the sheathed heater in accordance with the detected temperature within the casing 31, whereby the temperature within the casing 31 can be controlled to be held at a predetermined optimal temperature level for attaining a proper or stable operation of the gas rate sensor.

Also, there is provided a cylindrical support sleeve on the exterior circumference of the casing 31, and a further housing 22 which is formed of a heat insulating material.

Another sheathed heating wire 23 is inserted between the support sleeve 21 and the housing 22. This heating wire 23 is preferably adapted to be turned on and off by using, for instance, a second temperature sensor 24 which is installed in the interior of the support sleeve 21, for the purpose of maintaining the inside of the housing 22 at a constant temperature level.

More specifically, it is of course possible in practice that the temperature $T_C$ within the casing 31 and the temperature $T_H$ within the housing 22 can be held at any preferred levels by the sheathed heating wire 41 and the sheathed heating wire 23, respectively, but if it is arranged to provide such a relationship in the gradient between the two temperatures, i.e., $T_C > T_H$, it is possible to provide an efficient effect of cushioning an influence of possible ambient temperature change outside the housing 22.

As fully described hereinbefore, according to the present invention, there is provided the improved travel path indicating apparatus of the invention having such advantages that the current location of the vehicle in terms of the two-dimensional coordinates may be arithmetically obtained for a unit travel distance of the vehicle on the basis of the current outputs from the travel distance sensor adapted to detect the current travel distance of the vehicle and from the gas rate sensor adapted to detect the current azimuth of the vehicle as it travels the thus-obtained data changing from time to time being stored in sequence so as to be visually displayed for indicating the resultant travel path of the vehicle on the screen of the display unit, wherein there is provided the timer unit which is adapted to start supplying the power either to the gas rate sensor or to the thermostatic oven in which the gas rate sensor is incorporated upon the expiration of the predetermined period of time as preset, which is long enough to pass the period required by the gas rate sensor to reach its stable working internal temperature, whereby it is possible to immediately initiate the accurate visual indication of the current travel path of the vehicle upon starting same.

It is now clear that the objects as set forth hereinbefore among those made apparent from the preceding description are efficiently attained, and because certain changes and modifications may be made in the foregoing teaching without departing from the spirit and scope of the invention, it is intended that all matter contained in the foregoing description or shown in the accompanying drawings shall be interpreted as illustrative and not in any way limiting.

It is also to be understood that the appended claims are intended to cover all of such generic and specific features particular to the invention as disclosed herein and all statements relating to the scope of the invention, which might be said to fall thereunder.

What is claimed is:

1. A travel route indicating apparatus for use in an automotive vehicle, wherein a current travel route of the automotive vehicle in terms of two-dimensional coordinates may be obtained arithmetically for a unit travel distance of the vehicle on the basis of the outputs from a travel distance detecting unit adapted to detect a current travel distance of the vehicle, and from a gas rate sensor adapted to detect a resultant azimuth taken by the vehicle after the travel of the vehicle up to a current point of travel, so that the thus-obtained location data on the current location of the vehicle varying from time to time may be stored in sequence, and so that the current travel path of the vehicle may be continuously visually indicated as the vehicle travels, which comprises, in combination:

timer means for causing power supply means to initiate the supply of power to said gas rate sensor a preset period of time prior to starting said apparatus, as selectively set in advance by an operator, which period of time corresponds to the period to time required for said gas rate sensor to reach a stable operating temperature.

2. A travel route indicating apparatus for use in an automotive vehicle, wherein a current travel route of the automotive vehicle in terms of two-dimensional coordinates may be obtained arithmetically for a unit travel distance of the vehicle on the basis of the outputs from a travel distance detecting unit adapted to detect a current travel distance of the vehicle, and from a gas rate sensor adapted to detect a resultant azimuth taken by the vehicle after the travel of the vehicle up to a current point of travel, so that the thus-obtained locational data on the current location of the vehicle varying from time to time may be stored in sequence, and so that the current travel path of the vehicle may be continuously visually indicated as the vehicle travels, which comprises, in combination:

thermostatic oven means having said gas rate sensor enclosed in a heat insulating manner therein; and timer means for causing power supply means to initiate the supply of power to said thermostatic oven means a preset period of time prior to starting said apparatus, as selectively set in advance by an operator, which period of time corresponds to the period of time required for said gas rate sensor to reach a stable operating temperature.

* * * * *